Figure 1:
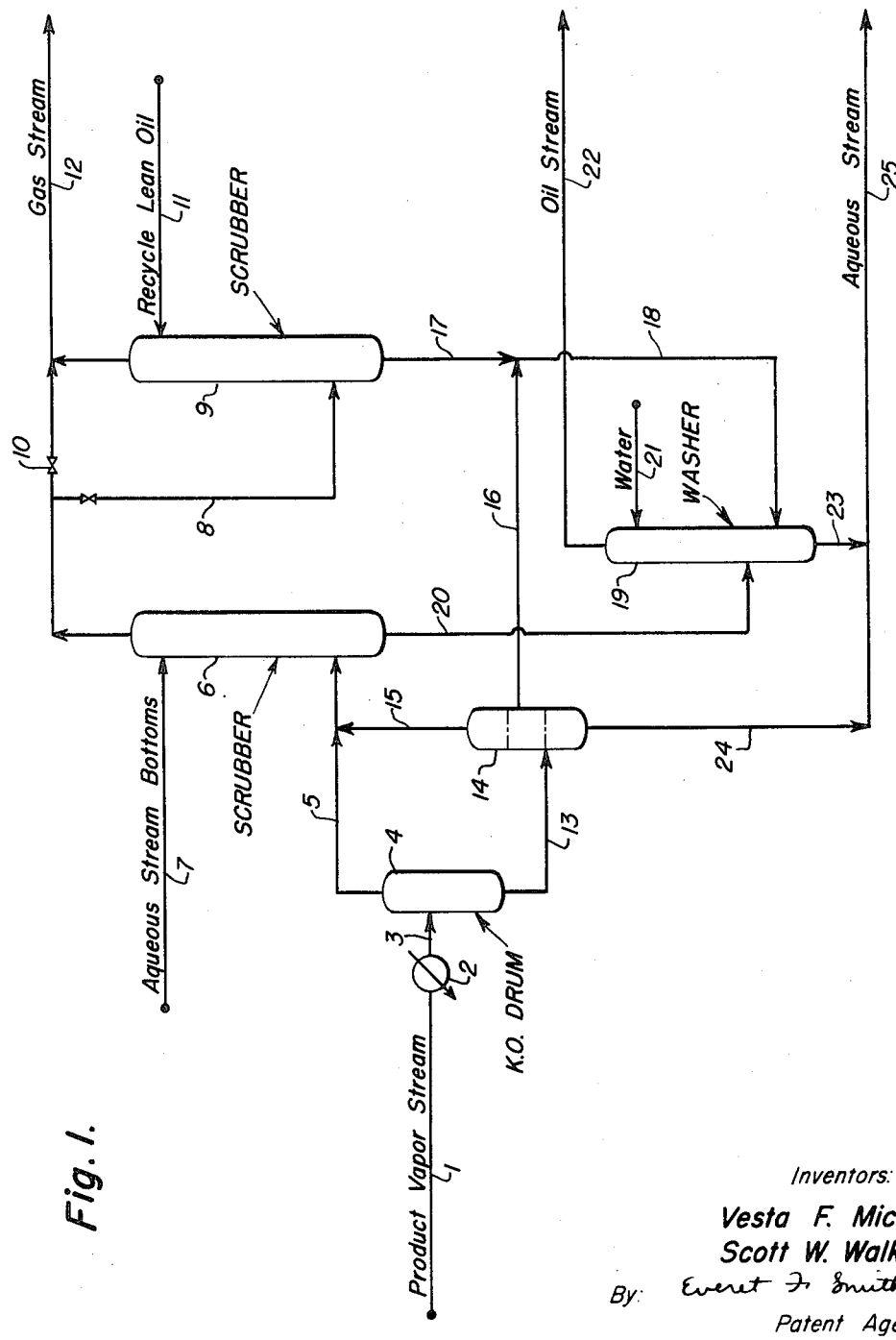

Dec. 28, 1948.                V. F. MICHAEL ET AL                2,457,257
                    SEPARATION OF OXYGENATED COMPOUND
                            WITH BISULFITE ADDUCTS
Filed Sept. 24, 1947                                         3 Sheets-Sheet 3

Fig. 3.

Inventors:
Vesta F. Michael
Scott W. Walker
By: Everet F. Smith
Patent Agent

Patented Dec. 28, 1948

2,457,257

UNITED STATES PATENT OFFICE 2,457,257

SEPARATION OF OXYGENATED COMPOUND WITH BISULFITE ADDUCTS

Vesta F. Michael and Scott W. Walker, Tulsa, Okla., assignors to Stanolind Oil and Gas Company, Tulsa, Okla., a corporation of Delaware Application September 24, 1947, Serial No. 775,918

20 Claims. (Cl. 260—643)

This invention relates to the recovery of organic oxygenated compounds from solutions thereof in organic liquids, and more particularly to a method for segregating, separating, and purifying alcohols, aldehydes, ketones, carboxylic acids, and phenolic compounds from mixtures thereof with hydrocarbons.

Our invention broadly comprises a novel method for segregating alcohols from solutions thereof in organic liquids by extracting the alcohols with an aqueous solution of aldehyde and ketone-bisulfite addition products, and subjecting the extract to a differential heat treatment above the decomposition temperature of the ketone-bisulfite addition products to separate therefrom a fraction containing the alcohols. By means of these steps, in combination with other operations as hereinafter set forth, we are able to separate solutions of organic oxygenated compounds into generically dissimilar groups, from which the individual components may then be conveniently isolated.

Numerous methods for preparing organic oxygenated compounds have been devised and reported in the prior art. Many of the methods produce the desired products in substantially pure condition, or in such mixtures that separation is comparatively simple by conventional means. Other methods, however, are less selective, and tend to produce complex mixtures from which the isolation of pure components is exceedingly difficult. For example, the direct oxidation of natural gas or of other hydrocarbon gases is potentially one of the cheapest sources of oxygenated compounds, and the method has therefore been studied extensively. The reaction products, however, are a complex mixture of the theoretically derivable organic oxygenated compounds, the isolation of which has proved to be very difficult. As a further example, the so-called Fischer-Tropsch synthesis, wherein carbon monoxide and hydrogen are reacted in the presence of a suitable catalyst, such as iron or cobalt, produces primarily hydrocarbons, but in addition a small yield of oxygenated compounds.

More recently, a new and improved process for the hydrogenation of carbon monoxide has been developed which permits the use of the fluidized-catalyst technique. The use of this new technique with a catalyst of suitable composition in combination with carefully chosen conditions of temperature, pressure, and space velocity gives not only much greater space-time yields, but also products of a more desirable boiling range and higher octane number. In addition, relatively higher yields of oxygenated compounds are produced.

In one embodiment of the new process, for example, wherein reduced iron catalysts containing around 1% of an alkali-metal compound, such as potassium hydroxide or potassium fluoride, are used to hydrogenate carbon monoxide, a water layer containing up to 15% or more of oxygenated compounds, and a hydrocarbon layer containing up to 40% or more of oxygenated compounds are produced under the following approximate conditions:

Temperature _____ 600–650° F.
Pressure _____ 150–300 lb./in.², gage
Space velocity _____ 12–20 cu. ft. CO, measured at 60° F. and one atmosphere, per pound of iron per hour
CO concentration in feed __ 10–20% by vol.
H₂:CO ratio in feed _____ 2–8

The two layers have been found to contain the following oxygenated compounds, and others: acetaldehyde, propionaldehyde, acetone, methanol, methyl acetate, butyraldehyde, ethyl acetate, ethyl methyl ketone, ethanol, n-propyl alcohol, methyl n-propyl ketone, n-butyl alcohol, ethyl butyrate, methyl n-butyl ketone, n-pentyl alcohol, n-decyl alcohol, higher aliphatic alcohols, acetic acid, propionic acid, butyric acid, 2-methylbutyric acid, valeric acid, 3-methylvaleric acid, 2-methylhexanoic acid, caprylic acid, capric acid, myristic acid, palmitic acid, stearic acid, phenol, and higher phenols. The hydrocarbons in the product comprise virtually the entire range of saturated and unsaturated hydrocarbons, from dissolved methane to high-melting waxes. The following table illustrates the daily output of the major oxygenated products from a plant employing the new process to produce 6,000 barrels per day (42 gallons per barrel) of gasoline-range hydrocarbons:

Aqueous phase

| | Gal./day |
|---|---|
| Acetaldehyde | 4,247 |
| Propionaldehyde | 873 |
| Acetone | 5,170 |
| Methanol | 333 |
| Butyraldehyde | 1,231 |
| Ethyl methyl ketone | 2,171 |
| Ethanol | 30,322 |
| n-Propyl alcohol | 6,879 |
| n-Butyl alcohol | 2,036 |
| n-Pentyl alcohol | 504 |
| Acetic acid | 8,609 |
| Propionic acid | 3,217 |
| Butyric acid | 1,579 |

Hydrocarbon phase

| | |
|---|---|
| Aldehydes and ketones | 3,964 |
| Alcohols | 4,492 |
| Acids | 3,629 |

It will be obvious to those skilled in the art that the isolation of individual components from such a complex mixture would be exceedingly difficult by any known methods. Simple, direct, fractional distillation of either the hydrocarbon phase or the aqueous phase is not feasible because of the numerous multiple-component azeotropes that are known to exist among the various constituents, and because of the tendency of certain of the compounds to react, decompose, or polymerize when such a mixture is exposed to elevated temperatures for considerable periods of time. Moreover, the literature discloses no selective solvent or solvents capable of effecting the separation of such mixtures into the individual components.

In this situation, a new and effective technique for isolating the components of the water-soluble aqueous products has been devised, as described in the copending Michael application, Serial No. 748,295, filed May 15, 1947; but the recovery of the oil-soluble oxygenated products on a large scale has been considered virtually impossible, and serious consideration has been given to the conversion or destruction of these compounds by means of solid catalysts at high temperatures to produce a liquid hydrocarbon product suitable for use as a motor fuel. Now, however, we have devised a unique, surprisingly simple, and effective technique, involving successive extractions and a differential heating step, by which we are able to isolate a remarkably high proportion of the oil-soluble oxygenated products.

One object of our invention is to provide a method for separating and purifying mixtures of organic oxygenated compounds from mixtures comprised thereof. Another object of our invention is to provide a method for segregating mixtures of organic liquids comprising organic oxygenated compounds into generically dissimilar groups of compounds. A further object of our invention is to provide a process for recovering organic oxygenated compounds, such as alcohols, aldehydes, ketones, carboxylic acids, and phenolic compounds, from hydrocarbon solutions thereof, and in particular from hydrocarbon solutions resulting from the oxidation of hydrocarbon gases, or from the hydrogenation of oxides of carbon, in particular carbon monoxide. Another object of our invention is to produce a hydrocarbon product relatively free of oxygenated compounds. A still further object is to produce a motor fuel of relatively good odor and of improved stability with respect to antiknock rating. Other objects of our invention, and its advantages over the prior art, will be apparent from the following description.

The term "generically dissimilar groups of compounds" occurring herein is to be understood as meaning groups having dissimilar chemical properties. Under this definition, alcohols and phenols are generically dissimilar groups; and ketones, aldehydes, and carboxylic acid are others.

An important factor in the development of our process was the unexpected discovery that alcohols may be separated from organic solutions thereof by extraction with an aqueous solution immiscible therewith comprising one or more bisulfite addition products (adducts) of aldehydes and/or ketones, as disclosed in the copending Michael application, Serial No. 775,919, filed September 24, 1947. It was also discovered that alcohols, aldehydes, and ketones can be removed simultaneously from organic solutions by extraction with an aqueous solution of a mixture of a water-soluble bisulfite and bisulfite addition products of aldehydes and/or ketones. We have now found unexpectedly that a fraction containing primarily alcohols and ketones can be liberated from an extract containing an alcohol, at least one bisulfite-ketone adduct, and at least one bisulfite-aldehyde adduct by heating the extract above about 40 to 50° C., but below about 80° C., after which the aldehydes remaining in the extract can be regenerated and removed by steam distillation, suitably at a temperature above about 80° C., or by treating the extract with an alkaline material or a strong acid.

By means of a process based on these phenomena, we are now able to make a substantially complete segregation of, for example, a hydrocarbon solution containing alcohols, aldehydes, ketones, carboxylic acids, and phenolic compounds by a process which may include the following steps:

1. Extraction of alcohols, aldehydes, and ketones from the hydrocarbon solution by use of an aqueous extractant solution comprising a water-soluble bisulfite, at least one ketone-bisulfite addition compound, and at least one aldehyde-bisulfite addition compound.

2. Heat treatment of the resulting aqueous extract above the decomposition temperature of the ketone-bisulfite addition compounds, but below the decomposition temperature of the aldehyde-bisulfite addition compounds, and separation of a fraction containing primarily alcohols and ketones. The separation may be effected by stratification, by stripping with steam or an inert gas, or by extraction with a selective solvent, such as a light hydrocarbon, an ester, or an aliphatic ether.

3. Further heat treatment of the aqueous phase from step 2 above the decomposition temperature of the aldehyde-bisulfite addition compounds, ordinarily above about 80° C., and separation of the liberated aldehydes by steam distillation or by extraction with a suitable solvent.

4. Extraction of the hydrocarbon raffinate from step 1 with an aqueous solution of a mild alkali, such as sodium carbonate, to separate carboxylic acids.

5. Extraction of the hydrocarbon raffinate from step 5 with an aqueous caustic solution, such as aqueous sodium hydroxide, to separate phenolic compounds.

Numerous modifications may conveniently be made in the basic process outlined above. For example:

A. In step 1, the hydrocarbon solution may be extracted simply with an aqueous solution of a water-soluble bisulfite. Bisulfite-carbonyl compound adducts are first formed and are extracted into the aqueous phase; the adducts then effect the extraction of alcohols into the aqueous phase.

B. A strong acid or an alkaline material may be added to the alcohol-depleted aqueous solution from step 2 to break down the bisulfite addition products therein and to release the aldehydes.

C. Steps 4 and 5 may be combined by extracting the hydrocarbon raffinate from step 1 with an aqueous caustic solution, such as aqueous sodium hydroxide, to separate carboxylic acids and phenolic compounds together.

Our process is suitable for separating alcohols from solution in virtually any organic liquid that is not completely miscible with aqueous bisulfite solutions and that is compatible with bisulfite adducts in the sense that it does not react substantially with or have any substantial tendency to destroy aldehyde-bisulfite and ketone-bisulfite addition compounds. Among such organic liquids may be cited aliphatic hydrocarbons in general, such as pentanes, pentenes, hexanes, hexenes, heptanes, heptenes, octanes, octenes, petroleum naphthas, and the like; alicyclic hydrocarbons, such as cyclohexane, cyclohexene, cyclopentane, methylcyclopentane, and the like; aromatic hydrocarbons, such as benzene, toluene, xylene, and the like; ethers, such as ethyl ether, isopropyl ether, butyl ether, ethyl butyl ether, and the like; and aldehydes and ketones in general, such as the group set forth above.

Water-soluble bisulfites in general are suitable for use in step 1 of our process, including bisulfites of alkali metals, specifically lithium, sodium, potassium, rubidium, and cesium; alkaline-earth metals, such as calcium, barium, and strontium; and ammonium and substituted ammoniums, such as methylammonium, diethylammonium, tris(2-hydroxyethyl) - ammonium, benzyltrimethylammonium, and the like; but owing to the lower cost and greater availability of potassium and sodium bisulfites, we ordinarily choose to use the latter two.

In step 1, the extraction should be carried out within the pH range in which the bisulfite addition compounds with aldehydes and ketones are stable, ordinarily between about pH 2.2 and 8, and preferably between about pH 5 and 8. For this reason, the pH of the stream of extractant supplied to the extraction column in step 1 should be adjusted as required by addition of an alkaline material, such as sodium hydroxide, or an acidic material, preferably sulfur dioxide or sulfurous acid, or a buffering agent, such as an acid sodium phosphate.

For the most effective extraction of aldehydes and ketones from the organic phase in step 1, the aqueous bisulfite extracting solution contacting each increment of the organic phase should contain a quantity of free bisulfite at least equivalent to the aldehydes and ketones in the organic-phase increment. Preferably, however, the free bisulfite should be present in at least slight excess, and we have found that 50 to 100% excess or more may be employed advantageously to speed up the extraction and to reduce the size of equipment required.

The aqueous bisulfite extracting solution employed in step 1 may suitably contain a total bisulfite concentration, including both free and bound bisulfite, between about 3 and 25 weight percent, calculated as the anhydrous bisulfite salt, and preferably between about 10 and 15 weight percent. Excessively high concentrations are difficult to work with, owing to their tendency to cause crystallization or gelling during the extraction step. On the other hand, very low concentrations would make it necessary to employ excessive volumes of extractant. For effective extraction of alcohols, the extractant solution should contain between about 7 and 20 weight percent of ketone-bisulfite and aldehyde bisulfite adducts, and preferably between about 10 and 15 weight percent. The adducts may be added to the extractant stream entering the extractor, or they may be formed in situ (modification A of step 1) by reaction of free bisulfite with ketones and aldehydes present in the organic solution. The concentration of adducts is not critical, and may be varied somewhat, depending on the quantity of alcohols to be extracted, the temperature of extraction, and the permissible quantity of non-alcoholic contaminants in the extract.

In the step 1 extraction, the aldehydes and ketones in the organic phase react with the bisulfite, giving a product which transfers readily into the aqueous phase; and the aldehyde-bisulfite and ketone-bisulfite adducts act as solubilizers for the alcohols, causing them also to transfer from the organic phase into the aqueous phase. This solubilizing effect depends, to some extent, on the molecular weight of the aldehydes and ketones in the addition compound. Bisulfite addition products of aldehydes and ketones having a distribution of molecular weights similar to the distribution of molecular weights in the alcohols have been found to be most desirable. Preferably, therefore, means should be provided for recycling a portion of the adduct streams from various points in our process, in addition to the regenerated bisulfite solutions, as detailed in the examples below. We have also found it advantageous to incorporate a limited quantity, suitably up to about ten percent, of a lower aliphatic alcohol, such as ethanol or methanol, or a quantity of a hydrophilic ester, such as ethyl acetate or butyl acetate, in the bisulfite-adduct extractant solution used in step 1, in order to reduce the tendency of the adducts to precipitate and to permit the use of higher concentrations of adducts. To this end, we may also recycle a portion of the step 1 extract directly to the step 1 extractant.

The term "hydrophilic ester" is to be understood as referring to esters having a solubility in water greater than about 1 percent by weight.

The step 1 extraction may be carried out satisfactorily at temperatures as low as 0° C. or somewhat below, the lower limit being the temperature at which freezing of the solution or precipitation of solids therefrom takes place. The upper temperature limits vary somewhat, depending on the type and quantity of ketones present in the organic solution and in the aqueous extractant solution. Ketone-bisulfite addition products become increasingly unstable at temperatures above about 40° C.; ordinarily, therefore, the extraction temperature should not be substantially above about 40° C.

The aqueous extract from step 1 contains aldehydes and ketones in chemical combination and alcohols in solution. The extract is subsequently heated to a temperature above the decomposition temperature of the ketone-bisulfite adducts, ordinarily above about 40° C., but below the decomposition temperature of the aldehyde-bisulfite adducts contained therein, ordinarily below about 80° C.; and a fraction comprising primarily alcohols and ketones is separated. The alcohol and ketone mixture may be separated from the aqueous solution by stratification, or, if desired, by extraction with a selective solvent immiscible with said aqueous solution. Light hydrocarbons, such as propane, butanes, pentanes, hexanes, and the like; esters, such as ethyl acetate, butyl acetate, methyl butyrate, and the like; and aliphatic ethers, such as ethyl ether, n-propyl ether, isopropyl ether, n-butyl ether, isoamyl ether, and the like, are particularly suitable for this extraction.

The heat treatment to regenerate and separate aldehydes (step 3) is preferably carried out above about 80° C. to accelerate the release of the aldehydes from the comparatively stable aldehyde-bisulfite adducts. The heat treatment is preferably combined with a steam distillation operation to release and separate the aldehydes in a single step. Alternatively, we may heat the alcohol-depleted and ketone-depleted aqueous solution from step 2 and extract the released aldehydes therefrom at around 80° C. or above, using solvents such as those employed in step 2, and operating in pressure equipment if necessary to avoid volatilization losses.

Subsequent processing of the various fractions produced in the above steps may be carried out according to methods known in the art. Specifically, fractional distillation, azeotropic distillation, and extractive distillation may be employed for separating the individual components of the alcohol-ketone mixture obtained in step 2, and of the aldehyde mixture obtained in step 3, and for further purifying the various hydrocarbon raffinate streams obtained in the process, containing diminished proportions of oxygenated compounds. The hydrocarbon raffinate streams may alternatively or additionally be contacted with active adsorption agents, such as silica gel or alumina to remove substantially all oxygenated compounds therefrom. The aqueous solution of carboxylic acid salts resulting from step 4 may be treated with a strong acid such as sulfuric acid to regenerate the carboxylic acids, and the acids may then be further processed, as by fractional distillation. The same procedure is suitable for further processing the aqueous solution of phenolates resulting from step 5.

Our invention will be more fully understood from the following specific examples:

Example I

The following example illustrates the application of our invention to the processing of a hydrocarbon solution containing mixed alcohols, aldehydes, and ketones. The major process steps were two in number: a single batch-type extraction of the hydrocarbon solution with an aqueous bisulfite-adduct solution, and a single batch-type extraction with heptane at an elevated temperature.

The hydrocarbon product layer resulting from the reaction of carbon monoxide with hydrogen over a fluidized-iron catalyst, as described above, was washed successively with water to remove water-soluble organic oxygenated compounds and with dilute aqueous sodium carbonate solution to remove organic acids. Analysis of the resulting washed hydrocarbon phase by the Grignard method showed that it contained 1.237 gram-moles per liter of mixed alcohols, and an additional quantity of mixed oil-soluble aldehydes and ketones.

One hundred parts by volume of the washed hydrocarbon phase were agitated 15 minutes at 40–45° C. with 100 parts by volume of an aqueous bisulfite adduct solution prepared by mixing 525 parts by weight of heptaldehyde, 525 parts by weight of methyl amyl ketone, 1120 parts by weight of sodium bisulfite, and 7980 parts by weight of water. The phases were then separated and analyzed. The aqueous layer measured 104 parts by volume and contained 0.573 gram-moles of alcohols per liter.

The aqueous phase was subsequently agitated 15 minutes at 70–75° C. with 100 parts by volume of heptane, and the layers were separated and analyzed.

The heptane layer measured 101 parts by volume, and contained 0.0378 gram-moles of alcohols per liter, together with 0.0175 gram-moles or carbonyl compounds, primarily ketones, per liter.

The aqueous raffinate was made alkaline and steam distilled, and from it were isolated 6.05 parts by weight of an organic layer having the following properties:

Specific gravity, 20/4° C. _____ 0.838
Refractive index, 20° C. _____ 1.4123

Chemical oxidation of the organic layer showed that it was composed primarily of aldehydes.

Example II

The following example illustrates a process utilizing our invention for the treatment of the hydrocarbon phase resulting from the reaction of hydrogen and carbon monoxide over an alkali-promoted iron catalyst under conditions chosen to yield a high conversion to organic oxygenated compounds, as defined above.

In a preliminary operation, the stream of product vapors resulting from the hydrogenation of carbon monoxide is condensed at least partially and separated into a gas stream, an oil stream, and a water stream. A convenient method for carrying out this separation is illustrated in Figure 1:

The product vapor stream flows through line 1 into heat interchanger 2, where the normally liquid constituents are condensed partially or completely, and the resulting mixture of gases, oil and water flows through line 3 into knockout drum 4. The gas stream emerges from the latter through line 5, and is successively passed upward through scrubbers 6 and 9. The liquids from the knockout drum flow through line 13 into separator 14, where the phases are permitted to separate. The separator is vented to gas line 5 through line 15.

Into the top of scrubber 6, a stream of water may be introduced through line 7. Preferably, however, a dilute aqueous solution of water-soluble fatty acids, such as the bottom stream obtained in topping the aqueous phase from separator 14, is fed into the top of scrubber 6. Substantially all of the water-soluble oxygenated compounds are removed from the gas stream in scrubber 6. Into the top of scrubber 9 is introduced a lean oil through line 11, suitably a portion of a hydrocarbon stream that has been partially or completely denuded of oxygenated compounds in a later stage of our process. Scrubber 9 may be by-passed by valve 10 if desired. The scrubbed gases, now virtually entirely free of oxygenated compounds, emerge from the top of scrubber 9 through line 12, and may be returned to process or otherwise disposed of.

By regulating the temperature within separator 14, the distribution of oxygenated compounds between the oil and water phases may conveniently be controlled as desired. We have observed that the higher the temperature within separator 14, the lower the concentration of oxygenated compounds in the aqueous phase.

The oil phase from separator 14 is withdrawn through line 16 and combined with the bottoms emerging from scrubber 9 through line 17, and the mixture is passed through line 18 into the bottom of washer 19. The aqueous bottoms emerging from scrubber 6 through line 20 are introduced into washer 19 at an intermediate point, and into the top of washer 19 is introduced a stream of fresh water through line 21. As the oil stream rises through washer 19, it is therefore scrubbed successively with a dilute aqueous solution of oxygenated compounds and then with fresh water. Substantially all of the water-soluble oxygenated compounds are thereby removed from the oil stream, which emerges through line 22 and is then further treated according to the process of our invention, in order to segregate oil-soluble oxygenated compounds therefrom.

The water stream from separator 14 is withdrawn through line 24 and mixed with the aqueous bottoms emerging from washer 19 through line 23. The aqueous mixture flows through line 25 to further processing steps, as described in the co-pending Michael application, S. N. 748,295, filed May 15, 1947.

Figure 2:
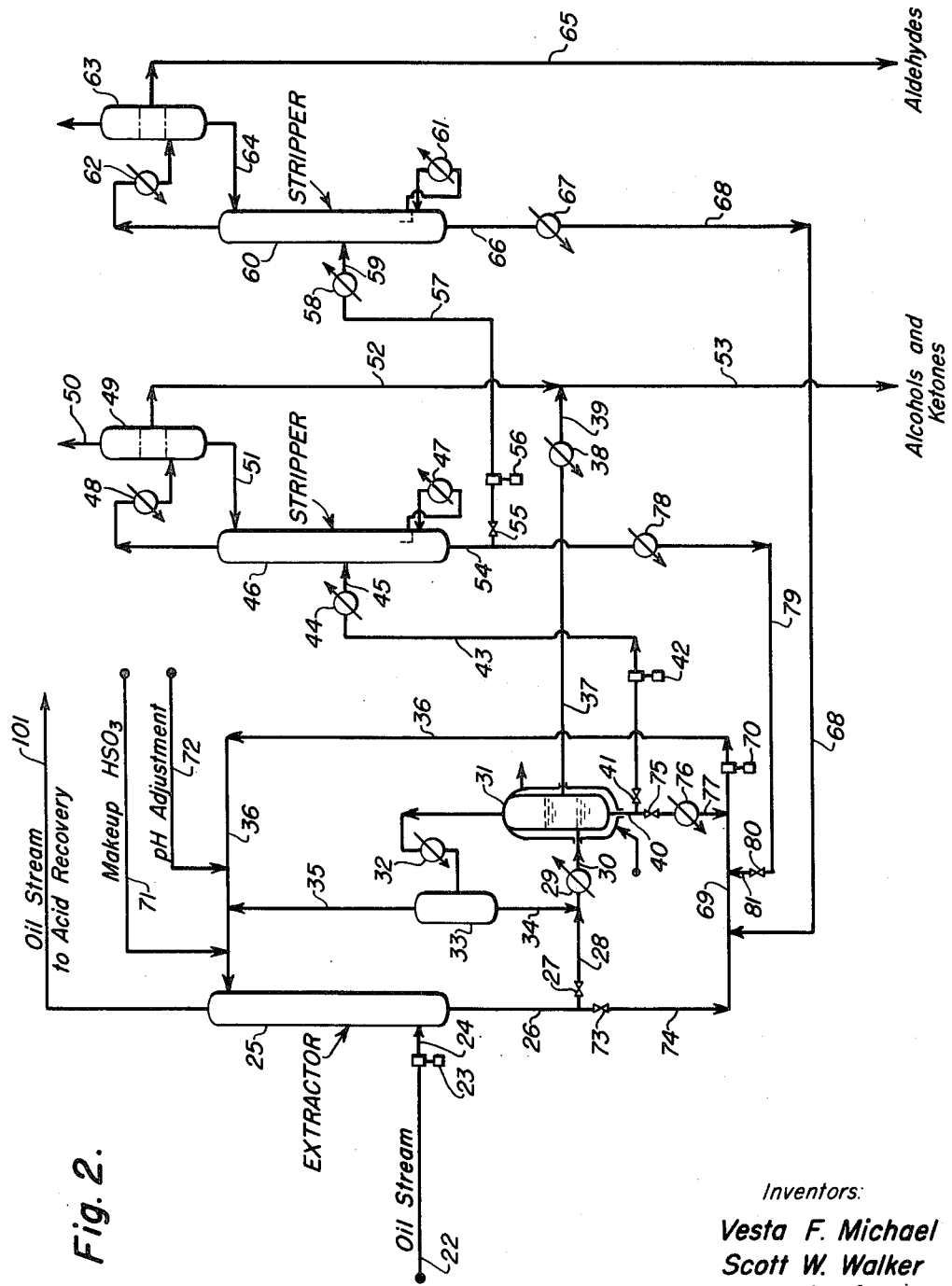

The hydrocarbon stream from washer 19 (Figure 1) flows through line 22 into pump 23 (Figure 2), and from there through line 24 into extractor 25, where it rises countercurrent to a downward-flowing aqueous solution of sodium bisulfite and bisulfite addition products of aldehydes and ketones at a temperature around 20° C. The free sodium bisulfite adds to the aldehydes and ketones, giving products which are transferred into the aqueous phase; and the bisulfite addition compounds act as solubilizers for the alcohols, permitting them also to be transferred into the aqueous phase.

The aqueous extract emerges from the bottom of extractor 25 through line 26 and valve 27 and flows through line 28 into heater 29. Therein, the stream is heated to a temperature between about 40 and 80° C., and is discharged through line 30 into hot separator 31. Vapors from the hot separator pass through cooler 32 into separator 33, from which any condensed liquid is recycled through line 34 to the inlet of heater 29, and any liberated sulfur dioxide is vented through line 35 to line 36, which carries recycle extractant back to extractor 25. Liberated alcohols and ketones form a separate phase in separator 31, and are withdrawn through line 37, cooler 38, and line 39. The aqueous phase in separator 31, containing dissolved alcohols and ketones, is withdrawn through line 40 and valve 41, and is transferred by pump 42 through line 43, heater 44, and line 45 into vacuum stripper 46 at an intermediate point. Residual dissolved alcohols and ketones are stripped from the entering stream at a temperature below about 80° C. by reboiler 47. The alcohols, ketones, and water vapor are taken overhead through condenser 48 into separator 49, to which a vacuum source is connected through line 50. The aqueous phase from the separator is refluxed to stripper 46 through line 51, and the alcohol and ketone phase is withdrawn through line 52. The alcohol and ketone streams in lines 52 and 39 are combined and withdrawn through line 53 to storage or to further processing.

The alcohol-depleted and ketone-depleted solution of bisulfite addition products flowing from the bottom of stripper 46 passes through line 54 and valve 55 into pump 56, by which it is transferred through line 57 into heater 58. The stream is heated therein to a temperature above about 80° C. and is discharged through line 59 into an intermediate point of stripper 60, equipped with reboiler 61. In the stripper, aldehydes are released from combination with the bisulfite, and are taken off overhead in admixture with water vapors through condenser 62 into separator 63. The aqueous phase from separator 63 is refluxed to stripper 60 through line 64, and the water-insoluble phase, comprising primarily aldehydes, is withdrawn through line 65 to storage or further processing, such as by fractional distillation. A stream of regenerated bisulfite solution emerges from the bottom of stripper 60 through line 66 and cooler 67, and is recycled to extractor 25 through line 68, line 69, pump 70, and line 36. Makeup bisulfite is added to the recycled stream as required through line 71, and the pH of the bisulfite stream is adjusted, preferably to between about 5 and 8, by addition of sodium hydroxide or sulfurous acid through line 72.

The ketone and aldehyde-bisulfite adducts that are required to solubilize the alcohols in extractor 25 are supplied to the regenerated bisulfite solution entering the top of the extractor through line 36 by adding thereto portions of other streams from various points in the process. For example, a portion of the stream emerging from extractor 25 through line 26, containing the desired adducts, plus free bisulfites and alcohols, may thus be withdrawn through valve 73 and introduced through line 74 and line 69 into pump 70. Similarly, a portion of the aqueous stream emerging from separator 31 through line 40, containing aldehyde-bisulfite adducts, dissolved aldehydes and ketones, and free bisulfite, may be withdrawn through valve 75 and recycled by way of cooler 76, line 77, line 69, and pump 70; and a portion of the bottoms emerging from stripper 46 through line 54, containing aldehyde-bisulfite adducts and free bisulfite, may be withdrawn through cooler 78, line 79, valve 80, line 81, line 69, and pump 70.

Hydrocarbons from the top of extractor 25 flow through line 101 (Figure 2) into pump 102 (Figure 3), and are transferred thereby through line 103 into the bottom of extractor 104, where they flow upward countercurrent to a downward-flowing aqueous 7 percent sodium carbonate solution, introduced through line 105. In this extractor, sodium salts of the carboxylic acids are formed, and are dissolved in the water phase. The aqueous solution flows from the bottom of extractor 104 through line 106, pump 107, line 108, heater 109, and line 110 into stripper 111 at an intermediate point. Dissolved hydrocarbons are stripped out of the solution by reboiler 112 and are taken overhead in admixture with water vapor through condenser 113 into separator 114, from which the aqueous phase is recycled to the stripper and the hydrocarbon phase is withdrawn through pump 115 and line 116 and combined with the hydrocarbon stream issuing from the top of extractor 104 through line 117. The stripped water solution from stripper 111 is withdrawn through line 118, cooler 119, and line 120, and is then acidified, preferably with sulfuric acid, added through line 121. The acidified mixture flows into an agitated reaction vessel 122, where it is cooled by a stream of cold water 123 flowing through jacket 124. Carbon dioxide produced by the acidification is allowed to escape through vent line 125. The acidified liquid flows from the bottom of reactor 122 through seal line 126 into knockout drum 127, where any remaining gases are separated and vented through line 128. From the bottom of knockout drum 127, the liquid emerges through line 129 and is transferred by pump 130 through line 131 into extractor 132 at an intermediate point. Into the bottom of the extractor is introduced through line 133 a solvent for fatty acids, which flows upward through the downward-flowing aqueous stream and extracts the fatty acids therefrom. Suitable solvents are aliphatic ethers, such as isopropyl ether, butyl ether, and the like; aromatic hydrocarbons, such as benzene, toluene, and the like; esters, such as ethyl acetate, butyl acetate, methyl butyrate, and the like; and high-boiling wood-oil fractions. Through line 134 at the top of the column is introduced a stream of fresh water, which washes any entrained or dissolved inorganic acid from the extract. The washed extract, comprising solvent and fatty acids, emerges through line 135 at the top of extractor 132, and is sent to storage or to further processing to isolate the various components of the mixture. The exhausted aqueous stream emerging through line 136 at the bottom of extractor 132 is discarded.

The hydrocarbon streams in lines 116 and 117, containing small proportions of phenolic compounds, are combined in line 137, and are transferred by pump 138 through line 139 into extractor 140, where they flow upward countercurrent to a downward-flowing aqueous 10 percent sodium hydroxide solution, introduced through line 141. In this extractor, sodium phenolates are formed, and are dissolved in the water phase. The aqueous solution flows from the bottom of extractor 140 through line 142, pump 143, line 144, heater 145, and line 146 into stripper 147 at an intermediate point. Dissolved hydrocarbons are stripped out of the solution by reboiler 148 and are taken overhead in admixture with water vapor through condenser 149 into separator 150, from which the aqueous phase is recycled to the stripper and the hydrocarbon phase is withdrawn through line 151 and combined with the hydrocarbon stream issuing from the top of extractor 140 through line 152.

The combined hydrocarbon streams, now containing only minor proportions of oxygenated compounds, flow through line 153 into pump 154, and are transferred thereby through line 155 into the bottom of washer 156. The hydrocarbons pass upward through the washer countercurrent to a stream of water, introduced at the top through line 157, which scrubs out any dissolved or entrained caustic material. The wash water from the bottom of the washer is discarded through line 158. The hydrocarbons emerge from the top of the washer through line 159, and are sent to storage or to further treatment, such as fractional distillation.

The stripped water solution from stripper 147 is withdrawn through line 160, cooler 161, and line 162, and is then acidified, preferably with sulfuric acid, added through line 163. The acidified mixture flows into an agitated reaction vessel 164, where it is cooled by a stream of cold water 165 flowing through jacket 166. The reaction vessel is vented through line 167. The acidified liquid flows from the bottom of reactor 164 through seal line 168 into knockout drum 169, where any entrained gases are separated and vented through line 170. From the bottom of knockout drum 169, the liquid emerges through line 171 and is transferred by pump 172 through line 173 into extractor 174 at an intermediate point. Into the bottom of the extractor is introduced through line 175 a solvent for phenolic compounds, which flows upward through the downward-flowing aqueous stream and extracts the phenolic compounds therefrom. Suitable solvents are aromatic, naphthenic, and saturated aliphatic hydrocarbons, such as benzene, toluene, cyclohexane, methylcyclopentane, hexanes, and octanes. Through line 176 at the top of the column is introduced a stream of fresh water, which washes any entrained or dissolved inorganic acid from the extract. The washed extract, comprising solvent and phenolic compounds, emerges through line 177 at the top of extractor 174, and is sent to storage or to further processing to isolate the various components of the mixture. The exhausted aqueous stream emerging through line 178 at the bottom of extractor 174 is discarded.

While the foregoing examples illustrate the preferred forms of our invention, it will be understood that departure may be made therefrom within the scope of the specification and claims. In general, it can be said that any modifications or equivalents that would ordinarily occur to those skilled in the art are to be considered as lying within the scope of our invention.

In accordance with the foregoing specification, we claim as our invention:

1. In a process for separating an alcohol from an organic solution comprised thereof, the steps which comprise contacting said organic solution with an immiscible aqueous phase in the presence of at least one bisulfite-ketone adduct and at least one bisulfite-aldehyde adduct; separating and withdrawing an aqueous extract; heating said aqueous extract to a temperature above the decomposition temperature of bisulfite-ketone adducts, but below the decomposition temperature of any bisulfite-aldehyde adduct contained therein; and separating from the heated aqueous extract an organic mixture comprising said alcohol and any liberated ketone.

2. The process of claim 1 wherein said organic solution comprises primarily a hydrocarbon liquid.

3. The process of claim 1 wherein said immiscible aqueous phase comprises also a member selected from the group consisting of hydrophilic esters and lower aliphatic alcohols.

4. The process of claim 1 wherein said organic solution is contacted at a temperature between about 0 and 40° C.

5. The process of claim 1 wherein said organic solution is contacted at a pH between about 2.2 and 8.

6. The process of claim 1 wherein said bisulfite adducts have substantially the same molecular-weight distribution as the alcohols present in said organic solution.

7. The process of claim 1 wherein said aqueous extract is heated to a temperature between about 40 and 80° C. to decompose bisulfite-ketone adducts contained therein.

8. The process of claim 1 wherein a portion of the alcohol-depleted and ketone-depleted aqueous extract is recycled to said immiscible aqueous phase.

9. The process of claim 8 wherein the alcohol-depleted and ketone-depleted aqueous extract is subsequently heated above the decomposition temperature of any bisulfite-aldehyde adduct contained therein; and said aldehyde is then separated therefrom.

10. The process of claim 9 wherein at least a portion of the aldehyde-depleted aqueous extract is recycled to said immiscible aqueous phase.

11. In a process for separating an alcohol from an organic solution comprising an alcohol, a ketone, and an aldehyde, the steps which comprise extracting said organic solution with an aqueous extractant solution immiscible therewith containing a water-soluble bisulfite; heating the resulting aqueous extract to a temperature above the decomposition temperature of bisulfite-ketone adducts in said aqueous extract, but below the decomposition temperature of any bisulfite-aldehyde adduct contained therein; and separating an organic mixture comprising said alcohol and said ketone.

12. The process of claim 11 wherein said water-soluble bisulfite is an alkali-metal bisulfite.

13. The process of claim 11 wherein said water-soluble bisulfite is sodium bisulfite.

14. The process of claim 11 wherein said aqueous extractant solution initially contains free bisulfite in a quantity at least equivalent to the uncombined carbonyl compounds contacted by said aqueous extractant solution.

15. In a process for separating an alcohol from an organic solution comprising an alcohol, a ketone, and an aldehyde, the steps which comprise extracting said organic solution with an aqueous extractant solution immiscible therewith comprising a water-soluble bisulfite and bisulfite addition products of carbonyl compounds selected from the group consisting of aldehydes and ketones; heating the resulting aqueous extract to a temperature above the decomposition temperature of bisulfite-ketone adducts in said aqueous extract, but below the decomposition temperature of any bisulfite-aldehyde adduct contained therein; and separating an organic mixture comprising said alcohol and said ketone.

16. The process of claim 15 wherein the total bisulfite, both free and bound, present in said aqueous extractant solution is between about 3 and 25% by weight, calculated as the anhydrous water-soluble bisulfite.

17. The process of claim 15 wherein said aqueous extractant solution contains bisulfite addition products having substantially the same composition with regard to identity and relative proportions of their constituent carbonyl compounds as said organic solution to be extracted therewith.

18. The process of claim 15 wherein said aqueous extractant solution contains bisulfite addition products resulting from said extraction.

19. In a process for separating and recovering generically dissimilar groups of organic oxygenated compounds from a heterogeneous liquid mixture comprising an alcohol, a ketone, an aldehyde, water, and a normally liquid hydrocarbon, the steps which comprise separating a hydrocarbon phase from said liquid mixture at an elevated temperature; extracting said hydrocarbon phase with an aqueous extractant solution comprising a water-soluble bisulfite; heating the resulting aqueous extract to a temperature above the decomposition temperature of bisulfite-ketone adducts in said aqueous extract, but below the decomposition temperature of any bisulfite-aldehyde adduct contained therein; and separating an organic mixture comprising said alcohol and said ketone.

20. In a process for separating and recovering generically dissimilar groups of organic oxygenated compounds from a hydrocarbon solution comprising an alcohol, a ketone, and an aldehyde, the steps which comprise extracting said hydrocarbon solution with an aqueous extractant solution comprising an alkali-metal bisulfite; separating said alcohol and said ketone from the resulting aqueous extract by extraction with a selective solvent at a temperature between about 40 and 80° C.; distilling the alcohol-depleted and ketone-depleted aqueous extract at a temperature above about 80° C. to regenerate and separate said aldehyde therefrom; further extracting the hydrocarbon raffinate from the initial extraction step with an aqueous solution of a mild alkali to remove carboxylic acids therefrom; and subsequently extracting the acid-depleted hydrocarbon raffinate with an aqueous caustic solution to remove phenolic compounds.

VESTA F. MICHAEL.
SCOTT W. WALKER.

REFERENCES CITED

The following references are of record in the file of this patent:

UNITED STATES PATENTS

| Number | Name | Date |
| --- | --- | --- |
| 1,095,830 | Ekstrom | May 5, 1914 |
| 1,704,751 | Luther et al. | May 12, 1929 |
| 2,080,111 | Bump | May 11, 1937 |
| 2,274,750 | Soenksen et al. | Mar. 3, 1942 |
| 2,288,281 | Huijser | June 30, 1942 |

FOREIGN PATENTS

| Number | Country | Date |
| --- | --- | --- |
| 472,545 | Great Britain | Sept. 23, 1937 |